United States Patent
Abbas

(10) Patent No.: US 9,741,039 B2
(45) Date of Patent: Aug. 22, 2017

(54) CLICK MODELING FOR ECOMMERCE

(71) Applicant: Abdelhalim Abbas, San Jose, CA (US)

(72) Inventor: Abdelhalim Abbas, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/680,450

(22) Filed: Nov. 19, 2012

(65) Prior Publication Data

US 2013/0132226 A1    May 23, 2013

Related U.S. Application Data

(60) Provisional application No. 61/562,992, filed on Nov. 22, 2011.

(51) Int. Cl.
*G06Q 30/06* (2012.01)
*G06Q 30/00* (2012.01)

(52) U.S. Cl.
CPC ......... *G06Q 30/00* (2013.01); *G06Q 30/0601* (2013.01)

(58) Field of Classification Search
CPC ............... G06Q 30/00; G06Q 30/0275; G06Q 30/0625; G06Q 30/06
USPC .................................. 705/26.1, 26.3, 26.62
See application file for complete search history.

(56) References Cited

U.S. PATENT DOCUMENTS

| | | | |
|---|---|---|---|
| 7,797,196 B1* | 9/2010 | Aaron et al. ................. | 705/26.1 |
| 2010/0125570 A1* | 5/2010 | Chapelle et al. ............. | 707/722 |
| 2012/0004978 A1* | 1/2012 | Kothari ................... | G06Q 30/02 |
| | | | 705/14.42 |
| 2012/0005028 A1* | 1/2012 | Stone ................. | G06Q 30/0275 |
| | | | 705/14.71 |
| 2012/0084155 A1* | 4/2012 | Roy ................... | G06Q 30/0273 |
| | | | 705/14.69 |
| 2012/0130858 A1* | 5/2012 | Kiss et al. ................. | 705/26.64 |

* cited by examiner

*Primary Examiner* — Mila Airapetian
(74) *Attorney, Agent, or Firm* — Schwegman Lundberg & Woessner, P.A.

(57) ABSTRACT

A system and method of click modeling are disclosed. A ranking algorithm is modified using a click model. The click model makes inferences based on user click data. The user click data includes indications of user intent to transact a shopping action for an item for sale. Item listings are ranked for a search results page using the ranking algorithm in response to receiving a search query. Each item listing comprises an item for sale on an e-commerce site. The user click data can also include user clicks of item listings in a search results page. The shopping action can include bidding on an item for sale or purchasing an item for sale.

18 Claims, 5 Drawing Sheets

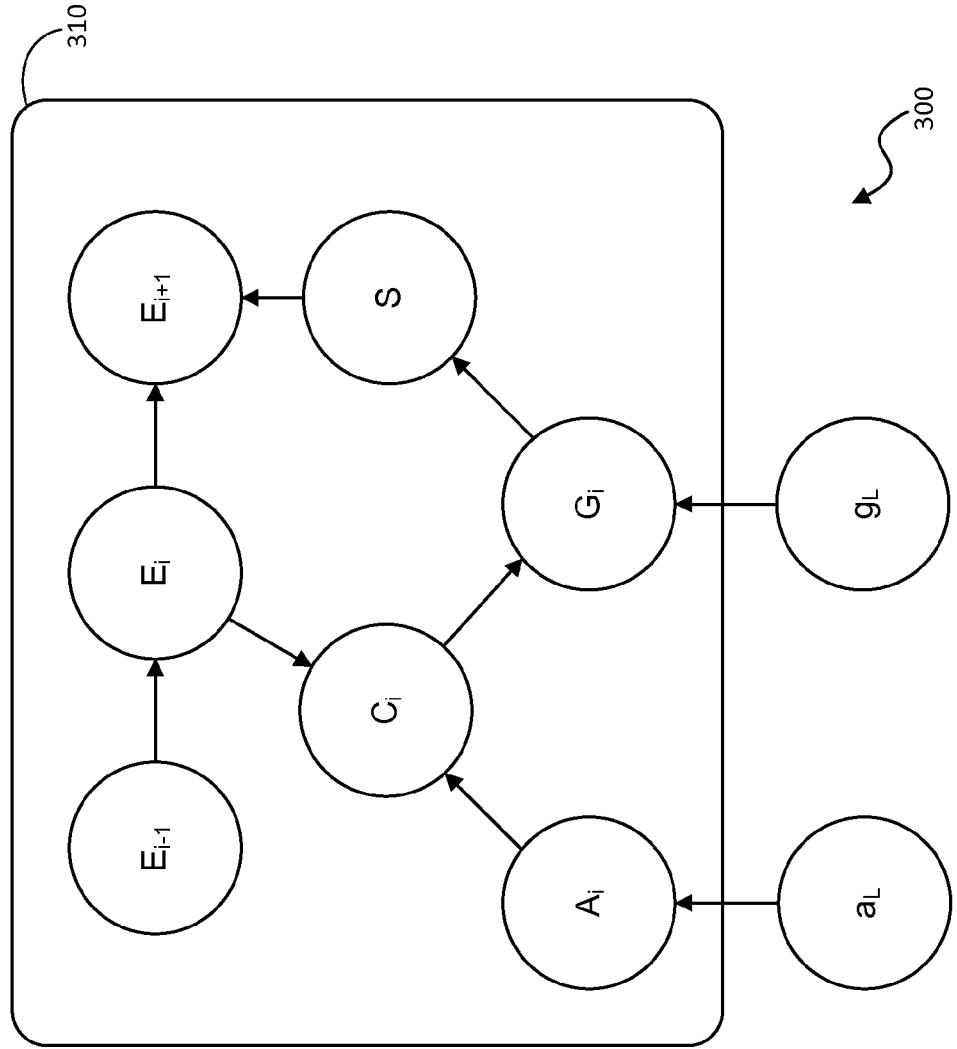

FIG. 3

$E_i$: Did the user examine the listing at position i $A_i$: Was the user attracted to the listing at position i $C_i$: Did the user click on the listing at position i $G_i$: Did the user find the listing at position i to be a good deal $S$: Did the user perform a successful shopping action (e.g., a bid or purchase)

$a_L$: How attractive the listing looks in the search results page $g_L$: How much of a good shopping deal the listing is

CLICK MODELING FOR ECOMMERCE

RELATED APPLICATIONS

This application claims priority to U.S. Provisional Application No. 61/562,992, filed on Nov. 22, 2011, and entitled, "CLICK MODELING FOR ECOMMERCE," which is hereby incorporated by reference in its entirety as if set forth herein.

TECHNICAL FIELD

The present application relates generally to information retrieval, and, in various embodiments, to systems and methods of click modeling.

BACKGROUND

Search engines are designed to crawl and gather data from information resources and index the data for quick retrieval. Search queries may be submitted and compared against the index to identify relevant information, which is provided in the form of search results. Various algorithms are used to improve the quality of search results. These algorithms may rank or weight search results in an attempt to reorder and return more relevant search results.

Click models are mathematical models used to infer a user's judgments on the relevance or irrelevance of specific search results. Click models may be part of learn-to-rank algorithms that attempt to learn to rank search results based in part on user behavior and interactions with search results. Current click models are not well-suited for electronic commerce (e-commerce) environments, where users interact with search results differently compared to search results returned by traditional search engines.

BRIEF DESCRIPTION OF THE DRAWINGS

Some embodiments of the present disclosure are illustrated by way of example and not limitation in the figures of the accompanying drawings, in which like reference numbers indicate similar elements and in which:

FIG. 3 illustrates an example embodiment of a click model;

DETAILED DESCRIPTION

Figure 1:
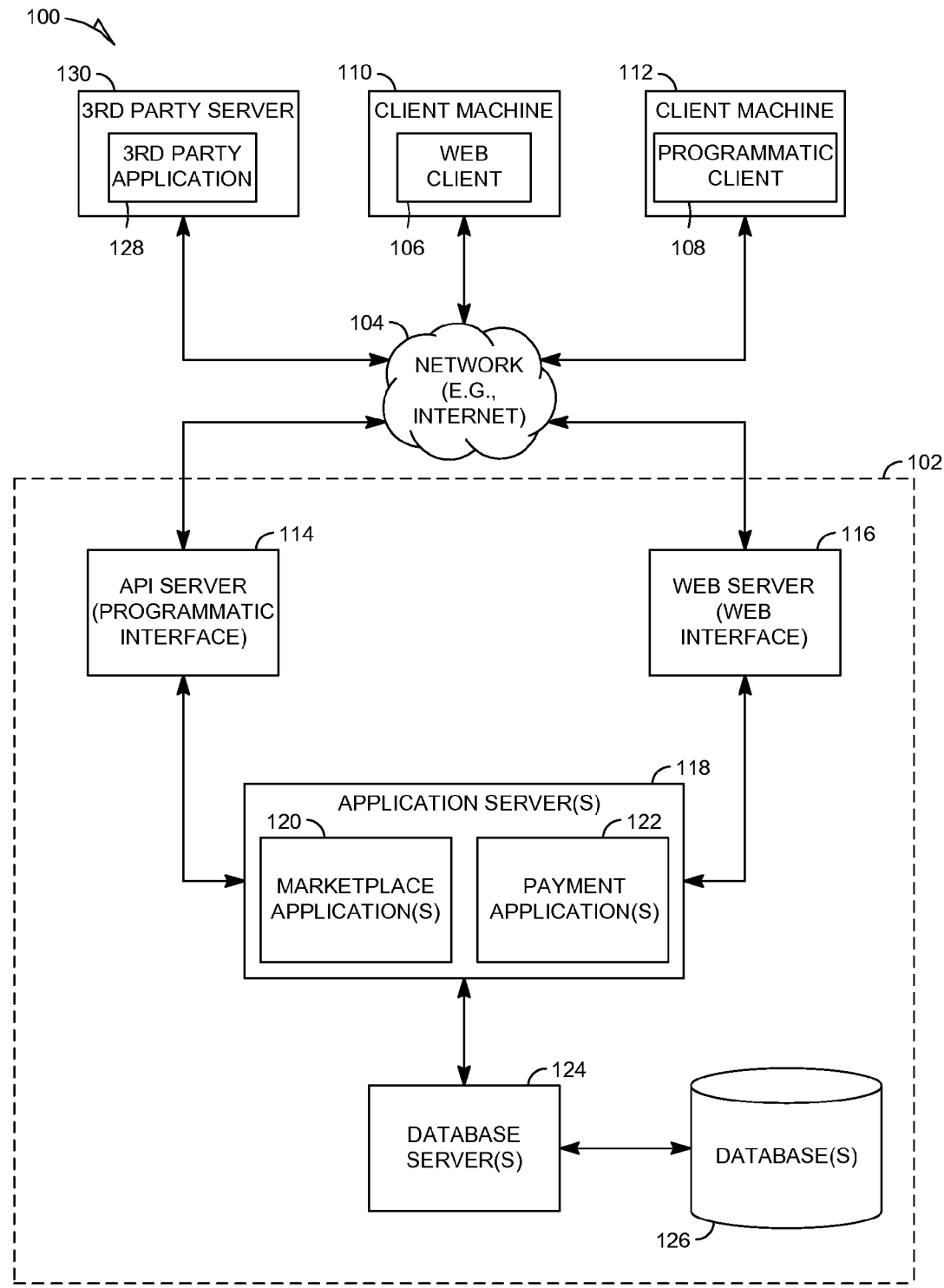
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Compared to users of general web search, shoppers on e-commerce sites are unlikely to be satisfied by examining the first relevant result on a search results page. Shopping and web browsing are radically different information retrieval exercises. For shopping, the items in the search results page are competing for business, and the shopper is in a process of arbitration, where he or she must choose to award business to zero items or one winning item.

Unlike web surfers, web shoppers are expected to sample seemingly relevant items until they feel satisfied that they have come across a representative sample of good deals as well as bad deals. Only then can a shopper make an informed decision that an item is a winner. In this setting, a good deal is only good relative to other deals that are not as good. For example, if the top ten results are equally good deals, then it would be expected that the shopper would keep scrolling down until a satisfactory number of bad deals are encountered. This behavior is in sharp contrast to general web browsing behavior.

The click model of the present disclosure focuses on e-commerce user behavior. This user behavior may include a user click event that leads to a successful shopping action. Examples of successful shopping actions include, but are not limited to, bidding on an item for sale or purchasing an item for sale.

In some embodiments, a ranking algorithm is modified using a click model. The click model can make inferences based on user click data. The user click data may include indications of user intent to transact a shopping action for an item for sale. A plurality of item listings can be ranked for a search results page using the ranking algorithm in response to receiving a search query. Each item listing may comprise an item for sale on an e-commerce site.

In some embodiments, the user click data further includes user clicks of item listings in a search results page. In some embodiments, the click model makes inferences of a measure of how attractive an item listing looks in a search results page based on the user click data. In some embodiments, the click model makes inferences of a measure of how much of a good shopping deal an item listing is based on the user click data. In some embodiments, the shopping action is bidding on an item for sale. In some embodiments, shopping action is purchasing an item for sale. In some embodiments, the click model determines a probability that a user will transact a shopping action for an item listing that the user is currently examining upon the user determining that the item listing is a good deal. The probability can be based, at least in part, on a sum of item listings that the user has previously examined and has found to be a good deal.

In some embodiments, a system comprises at least one processor, a navigation module, and a click modeling module. The navigation module may be executable by the at least one processor and be configured to rank a plurality of item listings for a search results page using a search algorithm in response to receiving a search query. Each item listing may comprise an item for sale on an e-commerce site. The click modeling module may be executable by the at least one processor and be configured to modify the search algorithm using a click model. The click model may be configured to make inferences based on user click data. The user click data may include indications of user intent to transact a shopping action for an item for sale.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
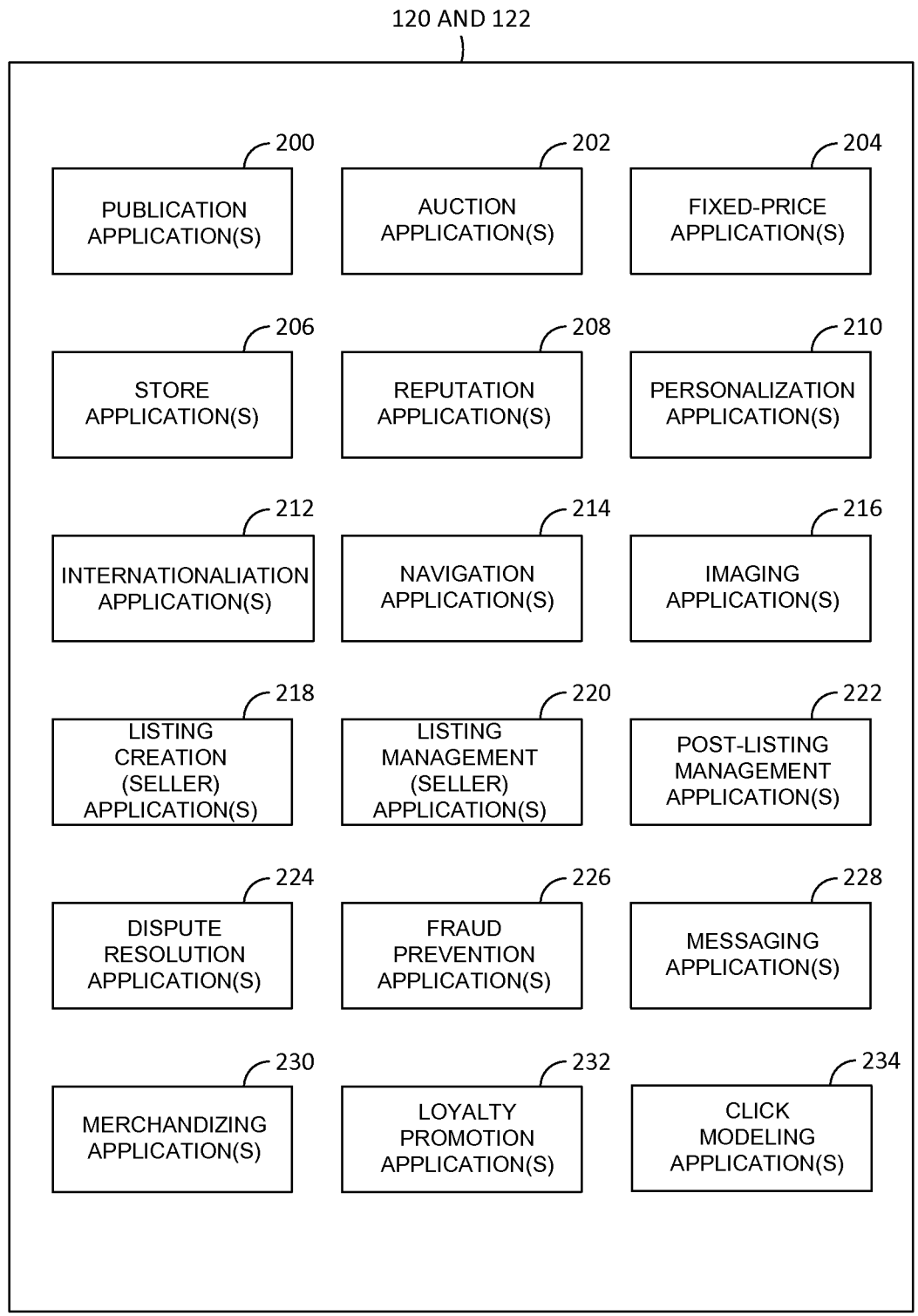
FIG. 2 is a block diagram depicting a various components of a network-based publisher, according to some embodiments.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings, available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Historical user click patterns on search result pages are a great resource for algorithms that attempt to learn to rank search results. If learn-to-rank algorithms could explicitly observe which results were deemed relevant by most users and which were not, we would have open access to the minds of users. Alas, we live in the real world where only user clicks can be observed, while their thought patterns are forever hidden for us to infer and speculate upon.

Click models are mathematical models that attempt to describe a typical user's decision process as he or she interacts with the search results page, so that we may infer the user's judgments on the relevance and irrelevance of specific search results. Take, for example, the following scenario. A user searched for "Meaning of life." A search result page with 50 results was served back. The user then clicked on search result #2, and we never heard from him again. Consider the following two explanations. The first explanation is that the user looked at the search results page, read the snippet returned for result #1, then ignored it as irrelevant. The user then moved to result #2, read the snippet, found it attractive, clicked through to the page, found the meaning of life in there, and then stopped the search, satisfied with what he found. The second explanation is that the user glanced at the search results page, chose result #2 randomly, read the snippet, found it somewhat relevant, clicked-through to the page, and found it completely irrelevant. Then, his phone rang and he abandoned the search. According to the first explanation, result #2 was relevant to the user's search. According to the second explanation, result #2 was not relevant to his search. Both explanations (and many others) are possible. But are they equally likely? A click model helps us assign mathematical probabilities to every such explanation, enabling us to use millions of scenarios to infer the likelihood of relevance for every search result against every search.

One or more click modeling applications 234 may be used to refine or revise a search algorithm that identifies and returns search results in response to a user query. In some embodiments, the one or more click modeling applications 234 are configured to modify the search algorithm using a click model. The click model may be configured to make inferences based on user click data. The user click data may include indications of user intent to transact a shopping action for an item for sale.

In some embodiments, the one or more click modeling applications 234 may receive monitored user interactions (e.g., clicks) with the search results and use the monitored user interactions to re-rank search results. In some embodiments, the one or more click modeling applications 234 may develop a click model for an e-commerce environment in which user behavior relative to search results often differs from user interactions with results provided by traditional search engines. In some embodiments, the click model may track user click events with respect to search results and may use user click events that lead to user transactions involving selected (e.g., clicked) search results to revise the click model. In some embodiments, these user click events may be used to revise or refine a search algorithm that identifies and returns search results in response to a user query. In some embodiments, the click model itself may be used to refine or revise the search algorithm.

FIG. 3 illustrates an example embodiment of a click model 300 that focuses on e-commerce user behavior. This click modeling framework can be applied to e-commerce click logs to greatly enhance the learnability of ranking algorithms from click data. The boolean variables inside box 310 relate to user behavior, whether observable or not. The boolean variables below the box relate to intrinsic properties of uniform resource locators (URLs). In some embodiments, clicks and shopping actions are the only observable events, while all other events are to be inferred using expectation maximization (EM) guided by the causality links that the model assumes between boolean variables. The causality links are denoted in the figure by arrows.

The click model 300 may be developed by the one or more click modeling applications 234. In this model, search result pages list items on sale rather than webpage URLs. Every listing L is assumed to have two independent intrinsic properties: $a_L$ and $g_L$. The $a_L$ property denotes how attractive the listing looks in the search results page, which influences clicks. The $g_L$ property denotes how much of a good shopping deal the listing really is, which can depend on the price, item details, seller details, shipping details, and other characteristics. Both variables $a_L$ and $g_L$ are latent—that is, they cannot be observed directly. However, they are assumed to influence the behavior of users on the site, and therefore can be inferred by analyzing click data.

The click model 300 may contain examine events $E_i$, which indicate whether a user examined the item listing at position i in the search results page. In some embodiments, the user is assumed to examine results sequentially top to bottom. The proposed model may also contain $A_i$ events, which indicate whether the user is attracted enough to the item listing at position i to click it. $G_i$ events may indicate whether the user found the item listing at position i to be a "good deal" over all. Click event $C_i$ may indicate whether the user clicked on the item listing at position i. Event S may indicate whether the user performed a successful shopping action, which would denote a successful shopping experience. For e-commerce sites, an S event translates into a successful shopping action for an item listing. In some embodiments, a successful shopping action can include, but is not limited to, bidding on an item for sale or purchasing an item for sale. Because S events are directly observable, this model enables learning from clicks, bids, and purchases simultaneously.

In some embodiments of the click model 300, upon finding a good deal, the user performs an S event with probability f(G), which may depend not only on the goodness of the current listing, but also on the goodness of all previously examined listings. In some embodiments, this is how the model accounts for users browsing multiple good and bad deals before arriving at an S decision. In some embodiments, f(G) can be the sum of good deals encountered, but can be generalized to the form: $f(G)=\alpha\Sigma(\text{good deals})+\beta\Sigma(\text{bad deals})$, where $\alpha$ and $\beta$ are model parameters.

In some embodiments, the click model 300 includes certain assumptions, which can then be used to revise a search algorithm. In some embodiments, the click model 300 may be configured to assume that when the user is attracted to the listing at position i, and the user has examined the listing at position i, then the user clicks the listing at position i. In some embodiments, the click model 300 may be configured to assume that the probability of the user being attracted to the listing at position i is equal to (or is in direct relation to) how attractive the listing looks in the search results page. In some embodiments, the click model 300 may be configured to assume that the probability of the user finding the listing at position i to be a good deal, given that the user has clicked on the listing at position i, is equal to (or is in direct relation to) how much of a good shopping deal the listing at position i really is, which may depend on the price, item details, seller details, shipping details, or other characteristics of the item listing. In some embodiments, the click model 300 may be configured to assume that if the user examines but does not click on the listing at position i, then the user does not find the listing at position i to be a good deal. In some embodiments, the click model 300 may be configured to assume that if the user performs a successful shopping action (e.g., a bid or purchase) for the item listing at position i, then the user does not examine the listing at position i+1 (i.e., the next listing). In some embodiments, the click model 300 may be configured to assume that the probability of the user examining the listing at position i+1 (i.e., the next listing), given that the user has examined the listing at position i and has not performed a successful shopping action for the listing at position i, is equal to (or is in direct relation to) a user persistence rate y, which is the probability that the user would continue to examine results after landing on an irrelevant item listing page. In some embodiments, the click model 300 may be configured to assume that if the user does not examine the listing at position i, then the user does not examine the listing at position i+1 (i.e., the next listing). In some embodiments, the click model 300 may be configured to assume that the probability of the user performing a successful shopping action is a function of the sum of good deals the user has encountered.

Figure 4:
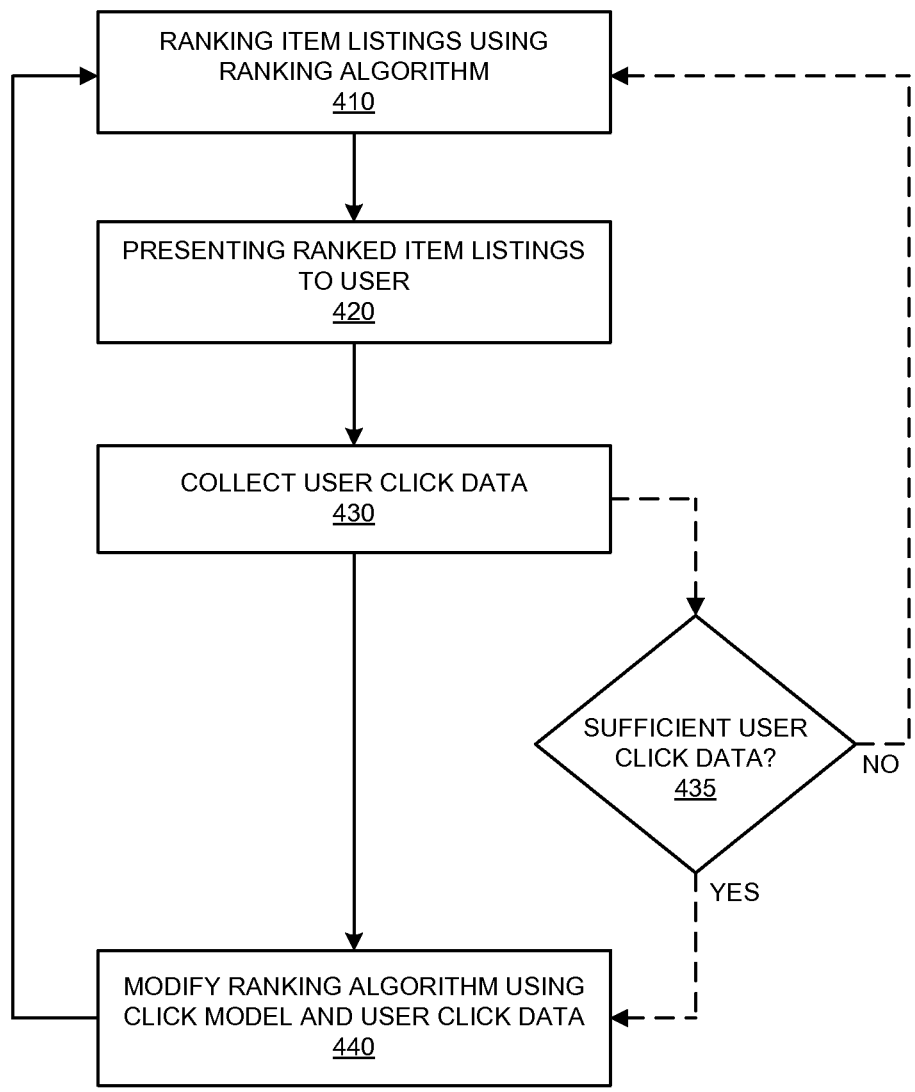
FIG. 4 is a flowchart illustrating an example embodiment of a method of implementing a click model.

FIG. 4 is a flowchart illustrating an example embodiment of a method 400 of implementing a click model. In some embodiments, the operations of the method 400 are performed by a system having at least one processor.

At operation 410, a plurality of item listings may be ranked for a search results page using a ranking algorithm in response to receiving a search query. Each item listing may comprise an item for sale on an e-commerce site. At operation 420, the ranked item listings may be presented to a user. In some embodiments, the ranked item listings may be presented to the user that submitted the search query. At operation 430, user click data may be collected. In some embodiments, the user click data may include but is not limited to, clicks that indicate a user's intent to transact a shopping action for an item for sale and clicks of item listings in a search results page. In some embodiments, the shopping action may include, is not limited to, bidding on an item for sale or purchasing an item for sale. At operation 440, the ranking algorithm may be modified using a click model. In some embodiments, the click model makes inferences based on the collected user click data. The method may then repeat at operation 410, where a plurality of item listings may be ranked for a search results page using the modified ranking algorithm in response to receiving a search query.

In some embodiments, the method may only proceed from operation 430, where user click data has been collected, to operation 440, where the ranking algorithm is modified using the click model and the collected user click data if a sufficient amount of user click data has been collected. At operation 435, the system determines whether there is a sufficient amount of user click data that has been collected. This determination may be based on a predetermined minimum amount of user click data that must be collected before proceeding to modify the ranking algorithm. If the system determines that there is a sufficient amount of user click data that has been collected, then the method may proceed to operation 440, where the ranking algorithm may be modified using the click model and the collected user click data. If the system determines that there is not a sufficient amount of user click data that has been collected, then the method may proceed to operation 410, where a plurality of item listings may be ranked for a search results page using the ranking algorithm, which has been unmodified since it was last used in the method 400.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmissions (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
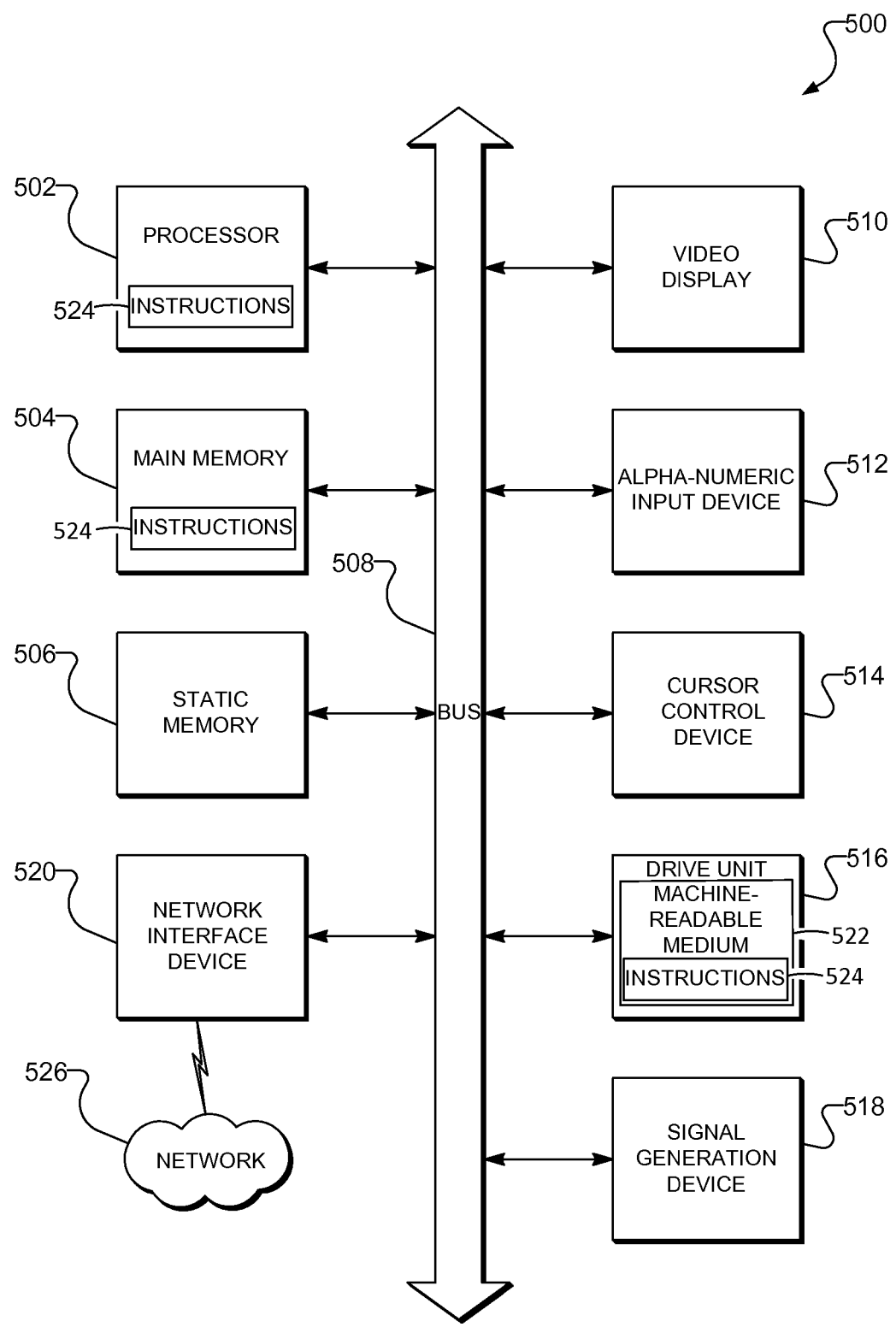
FIG. 5 shows a diagrammatic representation of a machine in the example form of a computer system within which a set of instructions may be executed to cause the machine to perform any one or more of the methodologies discussed herein.

FIG. 5 is a block diagram of a machine in the example form of a computer system 500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    at least one processor;
    a navigation module, executable by the at least one processor, configured to:
        receive a search query from a computing device of a current user;
        generate a plurality of item listings for a search results page based on the search query, each item listing of the plurality of item listings comprising an item for sale on an e-commerce site; and
        rank the plurality of item listings using a search algorithm; and
    a click modeling module, executable by the at least one processor, configured to:
        identify historical user click data including indications of user transaction of a shopping action for an item for sale, the shopping action comprising bidding on the item for sale or purchasing the item for sale;
        generate a click model based on the historical user click data, the click model configured to determine a probability that a particular user will transact the shopping action for an item listing, the probability being based, at least in part, on a sum of item listings that the particular user had previously examined and had found to be a good deal;
        receive historical click data of the current user;
        apply the historical click data of the current user to the click model, thereby generating a probability that the current user will transact the shopping action;
        modify the ranking of the plurality of item listings based on the generated probability, thereby generating a modified search results page; and
        provide the modified search results page to the computing device for display to the current user.

2. The system of claim 1, wherein the historical user click data further includes user clicks of item listings in a search results page.

3. The system of claim 1, wherein the click model is further configured to infer a measure of how attractive item listings look in a search results page based on the historical user click data.

4. The system of claim 1, wherein the click model is further configured to infer a measure of how much of a good shopping deal the item listings are based on the historical user click data.

5. The system of claim 1, wherein the shopping action is bidding on an item for sale.

6. The system of claim 1, wherein the shopping action is purchasing an item for sale.

7. A computer-implemented method comprising:
    identifying historical user click data including indications of user transaction of a shopping action for an item for sale, the shopping action comprising bidding on the item for sale or purchasing the item for sale;
    generating a click model based on the historical user click data, the click model being configured to determine a probability that a particular user will transact the shopping action for an item listing, the probability being based, at least in part, on a sum of item listings that the user has previously examined and has found to be a good deal;
    receiving a search query from a computing device of a current user;
    generating a plurality of item listings for a search results page based on the search query, each item listing of the plurality of item listings comprising the item for sale on an e-commerce site;
    ranking the plurality of item listings using a search algorithm;
    receiving historical click data of the current user;
    applying the historical click data of the current user to the click model, thereby generating a probability that the current user will transact the shopping action;
    modifying the ranking of the plurality of item listings based on the generated probability, thereby generating a modified search results page; and
    providing the modified search results page to the computing device for display to the current user.

8. The method of claim 7, wherein the historical user click data further includes user clicks of item listings in a search results page.

9. The method of claim 7, wherein the click model is further configured to infer a measure of how attractive item listings look in a search results page based on the historical user click data.

10. The method of claim 7, wherein the click model is further configured to infer a measure of how much of a good shopping deal the item listings are based on the historical user click data.

11. The method of claim 7, wherein the shopping action is bidding on an item for sale.

12. The method of claim 7, wherein the shopping action is purchasing an item for sale.

13. A non-transitory machine-readable storage device storing a set of instructions that, when executed by at least one processor, causes the at least one processor to perform operations comprising:

identifying historical user click data including indications of user transaction of a shopping action for an item for sale, the shopping action comprising bidding on the item for sale or purchasing the item for sale;

generating a click model based on the historical user click data, the click model being configured to determine a probability that a particular user will transact the shopping action for an item listing, the probability being based, at least in part, on a sum of item listings that the user has previously examined and has found to be a good deal;

receiving a search query from a computing device of a current user;

generating a plurality of item listings for a search results page based on the search query, each item listing of the plurality of item listings comprising the item for sale on an e-commerce site;

ranking the plurality of item listings using a search algorithm;

receiving historical click data of the current user;

applying the historical click data of the current user to the click model, thereby generating a probability that the current user will transact the shopping action;

modifying the ranking of the plurality of item listings based on the generated probability, thereby generating a modified search results page; and providing the modified search results page to the computing device for display to the current user.

14. The device of claim 13, wherein the historical user click data further includes user clicks of item listings in a search results page.

15. The device of claim 13, wherein the click model is further configured to infer a measure of how attractive item listings look in a search results page based on the historical user click data.

16. The device of claim 13, wherein the click model is further configured to infer a measure of how much of a good shopping deal the item listings are based on the historical user click data.

17. The device of claim 13, wherein the shopping action is bidding on an item for sale.

18. The device of claim 13, wherein the shopping action is purchasing an item for sale.

\* \* \* \* \*